United States Patent [19]

Park

[11] Patent Number: 5,748,791
[45] Date of Patent: May 5, 1998

[54] APPARATUS FOR DECIDING DCT BLOCK CLASSES IN A DVCR

[75] Inventor: Yong Cheol Park, Kyungki-do, Rep. of Korea

[73] Assignee: LG Electronics Inc., Seoul, Rep. of Korea

[21] Appl. No.: 660,202

[22] Filed: Jun. 3, 1996

[30] Foreign Application Priority Data

Jun. 14, 1995 [KR] Rep. of Korea ............... 15712/1995

[51] Int. Cl.[6] .............................. G06K 9/36; G06K 9/46
[52] U.S. Cl. ................................ 382/250; 382/251
[58] Field of Search ................................ 382/250, 251; 348/403, 404, 405

[56] References Cited

U.S. PATENT DOCUMENTS 5,481,309  1/1996  Turi et al. ............................ 348/405

Primary Examiner—Leo Boudreau
Assistant Examiner—Dmitry A. Novik
Attorney, Agent, or Firm—John P. White

[57] ABSTRACT

An apparatus for deciding DCT block classes in a DVCR includes a scanning section for scanning AC coefficients among coefficients of respective DCT blocks, an absolute-value getting section for taking absolute values of the AC coefficients, a maximum value detecting section for obtaining the maximum values of respective DCT blocks from outputs of the absolute-value getting section, a minimum value detecting section for obtaining the minimum values from the maximum values of the DCT blocks obtained by the maximum value detecting section, and a deciding section for comparing outputs of the minimum value detecting section as threshold values with outputs of maximum value detecting section to decide the classes with respect to the DCT blocks. Thus, the threshold values used for deciding the classes of the DCT blocks are obtained by considering relative characteristics between the DCT blocks within a macro block and quantization step size to enable adaptive class categorization of the DCT blocks with respect to an input image, thereby enhancing quantization efficiency to improve picture quality.

8 Claims, 7 Drawing Sheets

FIG.4 prior art (8*8)DCT

|   | 0 | 1 | 2 | 3 | 4 | 5 | 6 | 7 |
|---|---|---|---|---|---|---|---|---|
| 0 | DC| 0 | 0 | 1 | 1 | 1 | 2 | 2 |
| 1 | 0 | 0 | 1 | 1 | 1 | 2 | 2 | 2 |
| 2 | 0 | 1 | 1 | 1 | 2 | 2 | 2 | 3 |
| 3 | 1 | 1 | 1 | 2 | 2 | 2 | 3 | 3 |
| 4 | 1 | 1 | 2 | 2 | 2 | 3 | 3 | 3 |
| 5 | 1 | 2 | 2 | 2 | 3 | 3 | 3 | 3 |
| 6 | 2 | 2 | 2 | 3 | 3 | 3 | 3 | 3 |
| 7 | 2 | 2 | 3 | 3 | 3 | 3 | 3 | 3 |

(2*4*8)DCT sum

|   | 0 | 1 | 2 | 3 | 4 | 5 | 6 | 7 |
|---|---|---|---|---|---|---|---|---|
| 0 | DC| 0 | 1 | 1 | 2 | 2 | 2 | 3 |
| 1 | 0 | 1 | 1 | 2 | 2 | 2 | 3 | 3 |
| 2 | 1 | 1 | 2 | 2 | 2 | 3 | 3 | 3 |
| 3 | 1 | 2 | 2 | 2 | 3 | 3 | 3 | 3 | difference

|   | 0 | 1 | 2 | 3 | 4 | 5 | 6 | 7 |
|---|---|---|---|---|---|---|---|---|
| 4 | DC| 0 | 1 | 1 | 2 | 2 | 2 | 3 |
| 5 | 0 | 1 | 1 | 2 | 2 | 2 | 3 | 3 |
| 6 | 1 | 1 | 2 | 2 | 2 | 3 | 3 | 3 |
| 7 | 1 | 2 | 2 | 2 | 3 | 3 | 3 | 3 |

FIG.5
prior art

|  | Class No. | | | | Area No. | | | |
|---|---|---|---|---|---|---|---|---|
|  | 0 | 1 | 2 | 3 | 0 | 1 | 2 | 3 |
| quantizer number(QNo) | 15 |  |  |  | 1 | 1 | 1 | 1 |
|  | 14 |  |  |  | 1 | 1 | 1 | 1 |
|  | 13 |  |  |  | 1 | 1 | 1 | 1 |
|  | 12 | 15 |  |  | 1 | 1 | 1 | 1 |
|  | 11 | 14 |  |  | 1 | 1 | 1 | 1 |
|  | 10 | 13 |  | 15 | 1 | 1 | 1 | 1 |
|  | 9 | 12 | 15 | 14 | 1 | 1 | 1 | 1 |
|  | 8 | 11 | 14 | 13 | 1 | 1 | 1 | 2 |
|  | 7 | 10 | 13 | 12 | 1 | 1 | 2 | 2 |
|  | 6 | 9 | 12 | 11 | 1 | 1 | 2 | 2 |
|  | 5 | 8 | 11 | 10 | 1 | 2 | 2 | 4 |
|  | 4 | 7 | 10 | 9 | 1 | 2 | 2 | 4 |
|  | 3 | 6 | 9 | 8 | 2 | 2 | 4 | 4 |
|  | 2 | 5 | 8 | 7 | 2 | 2 | 4 | 4 |
|  | 1 | 4 | 7 | 6 | 2 | 4 | 4 | 8 |
|  | 0 | 3 | 6 | 5 | 2 | 4 | 4 | 8 |
|  |  | 2 | 5 | 4 | 4 | 4 | 8 | 8 |
|  |  | 1 | 4 | 3 | 4 | 4 | 8 | 8 |
|  |  | 0 | 3 | 2 | 4 | 8 | 8 | 16 |
|  |  |  | 2 | 1 | 4 | 8 | 8 | 16 |
|  |  |  | 1 | 0 | 8 | 8 | 16 | 16 |
|  |  |  | 0 |  | 8 | 8 | 16 | 16 |

…

APPARATUS FOR DECIDING DCT BLOCK CLASSES IN A DVCR

BACKGROUND OF THE INVENTION

1. Field of the Invention

The present invention relates to a compressing and coding apparatus of a DVCR, and more particularly to an apparatus for deciding DCT block classes in a DVCR for adaptively categorizing classes of DCT blocks during the discrete cosine transform (hereinafter referred to as "DCT") process which is one of compressing & coding process.

2. Description of the Prior Art

FIG. 1 illustrates a block construction showing a compressing and coding apparatus for recording input video signals in a general DVCR. Here, block forming section 1 bundles four luma signal blocks of 8×8 size with two color difference signals Cr and Cb of 8×8 size placed in the same space of the luma signal blocks to form a macro block.

A shuffling section 2 takes five macro blocks in order by a prescribed pattern from outputs of block forming section 1 for making the quantity of information be uniform to put them together, thereby forming a segment.

Outputs of shuffling section 2 are supplied to a DCT section 3 to be subjected to the DCT. At this time, since the (8×8) block consists of two field signals, the motion range between respective fields is detected to perform the (8×8) DCT in case of involving slight motion or perform the (2×4×8) DCT by obtaining the sum and difference between respective field signals in case of involving distinguished motion, in which the detection of the motion range is performed in a motion detecting section 5.

Motion detecting section 5 supplies motion detection information, i.e., mode selection information M1 which performs the (8×8) DCT for the slight motion or the (2×4×8) DCT for the great motion by DCT section 3, to a multiplexer MUX1.

Output of DCT section 3 are categorized to four classes via a class deciding section 4, and class sort information CNO is supplied to multiplexer MUX1.

Here, the class decision is for categorizing the classes in view of characteristics of respective DCT blocks. For this operation, the maximum value is detected in AC coefficients of respective DCT blocks and the detected maximum value is compared with an optional threshold value to be classified.

In other words, while the great AC coefficient value has much energy and complicated shape to be allotted with high class, the lower AC coefficient value has little energy and simple shape to be allotted with low class.

At this time, the operation of deciding the class by judging the class is for adaptively performing a quantization process to be suited to the DCT block characteristics. Thus, the DCT block allotted with the high class is subjected to further quantization, and that allotted with the low class is subjected to less quantization.

The class deciding operation by class deciding section 4 will be described with reference to FIG. 2 which illustrates the technique disclosed in Japanese Laid-open Publication No. Hei 6-78286.

First, when the (8×8) DCT is performed in DCT section 3, a scanning unit 4a selects the AC coefficients as shown in FIG. 3A among the (8×8) DCT coefficients, and absolute values of the selected AC coefficients are taken in absolute-value getting unit 4b to be supplied to a comparator 4c. If the supplied value is greater than a threshold value TH1, counting of a counter 4d is augmented.

An absolute-value getting unit 4e scans the AC coefficients except for the DC coefficient as shown in FIG. 3B for taking the absolute values to provide the absolute values into a comparator 4f. If the absolute value is larger than a threshold value TH2, the value is latched by a flip-flop 4g. Here, threshold value TH2 is 255.

At this time, classes of respective (8×8) DCT blocks are sorted by the values of counter 4d and latch 4g via comparators 4h–4j, an OR gate 4k and a logic unit 4l. Thus, when the output of flip-glop 4g is one or the value of counter 4d is larger than a threshold value TH5, it is sorted to class 3. Whereas, when the value of counter 4d is larger than a threshold value TH4 and smaller than threshold value TH5, it is sorted to class 2; when being between threshold values TH3 and TH4, sorted to class 1; and is being smaller than threshold value TH3, sorted to class 0.

A data-quantity estimating section 6 quantizes the class information of respective (8×8) DCT blocks from class deciding section 4 and area partition information as shown in FIG. 4 by using the quantization step size as shown in FIG. 5, and then codes the result by using a variable-length coder to store a code length in the coding. Thereafter, a quantizer the most adjacent to a preset code length is selected in the segment unit. That is, the optimum quantizer corresponding to the input signal is selected to supply a number QN0 of the selected quantizer to a quantizing section 8 and multiplexer MUX1.

By doing so, outputs of a buffer 7 which succeeds DCT section 3 are quantized in the quantizer selected in quantizing section 8, and then variable-length coded via a variable length coding section 9.

Multiplexer MUX1 multiplexes the class decision information from class deciding section 4 determined in the DCT block unit, mode selection information M1 from motion detecting section 5 and number QN0 of the quantizer selected from data-quantity estimating section 6 determined in the segment unit with the DCT block to provide the multiplexed result.

In the conventional technique, however, the threshold voltage is fixed when the dynamic range of the AC coefficients of respective macro blocks or segments is significantly changed (e.g., when it is thoroughly small or large). Therefore, the classes of respective DCT blocks of the macro blocks or segments may not be classified into four steps.

Consequently, if respective DCT blocks of the macro blocks or segments are sorted into class 0 or 1 since overall AC coefficient values of respective macro blocks or segments are small, the quantization is performed in the step of the classes 0, 1 and 2. Thus, a quantization error may be increased.

Furthermore, since the fixed threshold values are utilized during deciding the classes of the DCT blocks, the class sorting is not appropriately executed with respect to input picture having different characteristics, thereby lowering quantization efficiency to degrade picture quality.

SUMMARY OF THE INVENTION

It is an object of the present invention to provide an apparatus for deciding DCT block classes in a DVCR, wherein, to solve the foregoing problems, class decision is carried out by adaptively adjusting threshold values in consideration of characteristics between DCT blocks constituting macro blocks to decrease a quantization error, thereby enhancing quantization efficiency and improving picture quality.

To achieve the above object of the present invention, an apparatus for deciding DCT block classes in a DVCR includes a scanning & absolute-value getting section for scanning AC coefficients among coefficients of respective DCT blocks, and taking absolute values of the AC coefficients. Then, the AC coefficients of respective DCT blocks taking the absolute values in the scanning & absolute-value getting section are sequentially compared in a maximum value detecting section to obtain the maximum values of respective DCT blocks. A minimum value detecting section compares respective maximum values of the plurality of DCT blocks obtained in the maximum value detecting section to obtain the minimum values which are compared in a deciding section as threshold values with outputs of maximum value detecting section, and the classes with respect to the DCT blocks are decided by the deciding section.

BRIEF DESCRIPTION OF THE DRAWINGS

The above objects and other advantages of the present invention will become more apparent by describing in detail preferred embodiments thereof with reference to the attached drawings in which:

FIG. 4 is views showing area partitioning information of the general DCT blocks;

FIG. 5 is a view showing the size of the quantization step for explaining an operation of the data-quantity estimating section of FIG. 1;

DETAILED DESCRIPTION OF THE PREFERRED EMBODIMENT

An embodiment of an apparatus for deciding DCT classes in a DVCR according to the present invention will be described with reference to the accompanying drawings.

Figure 1:
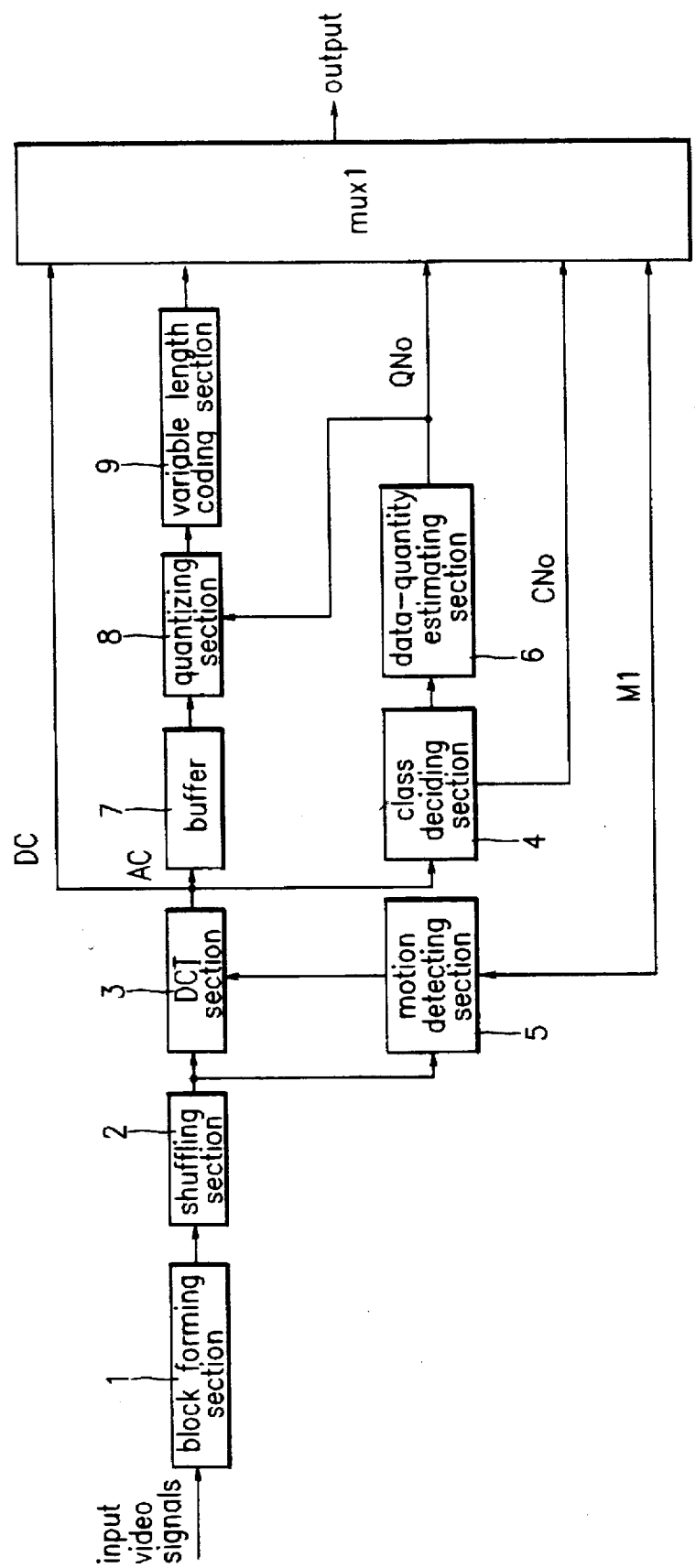
FIG. 1 is a block construction view showing a compressing & coding apparatus in a general DVCR.
Figure 2:
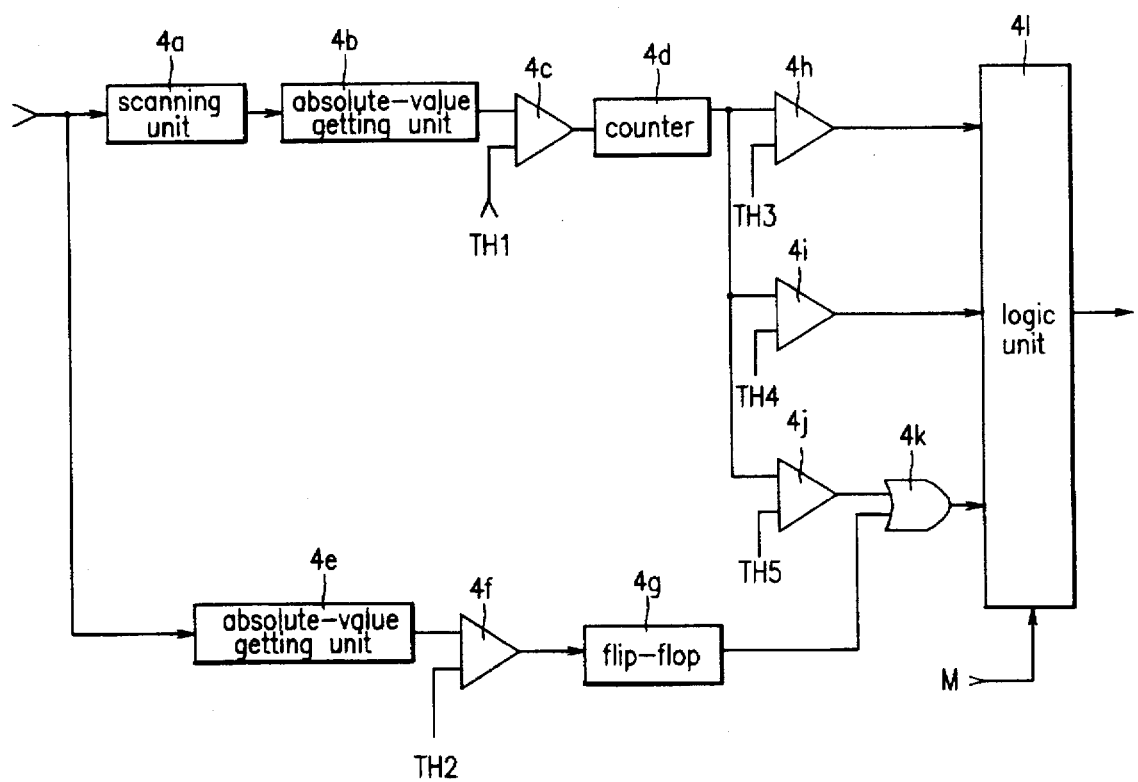
FIG. 2 is a block construction view showing the class deciding section of FIG. 1.
Figure 3A:
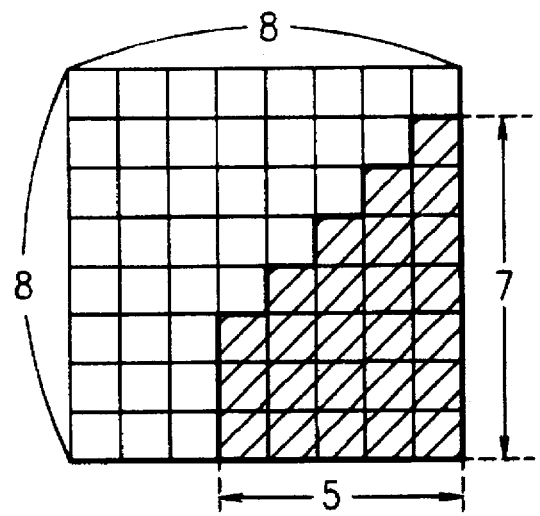
FIGS. 3A and 3B are views representing the AC coefficients utilized in FIG. 2.
Figure 3B:
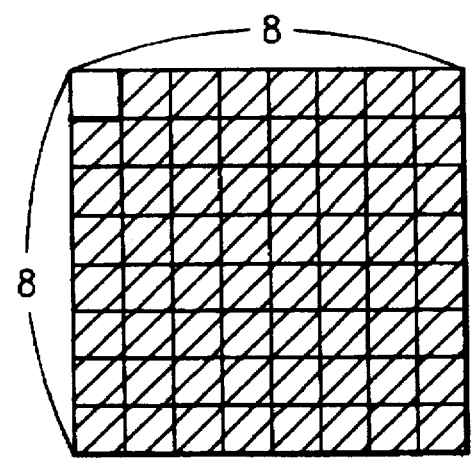
Figure 6:
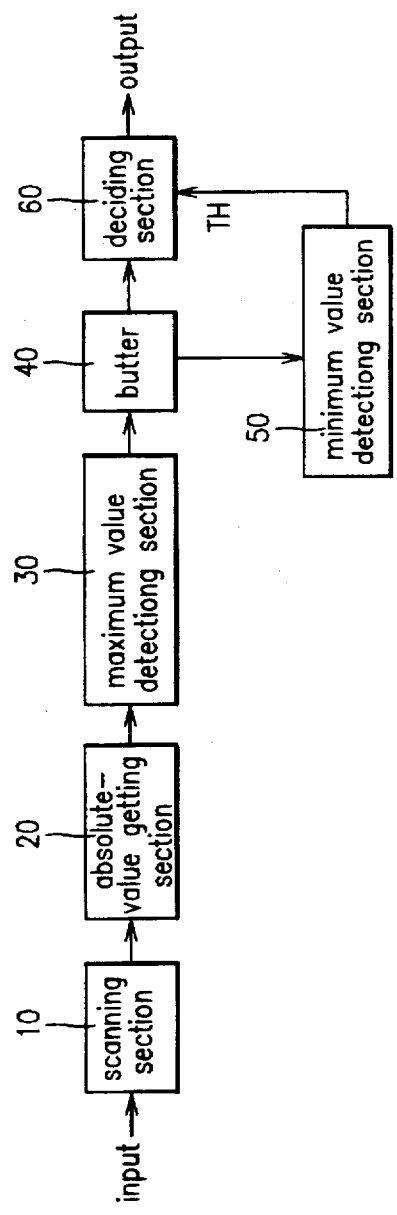
FIG. 6 is a block construction view showing an apparatus for deciding DCT block classes in a DVCR according to the present invention.

Referring to FIG. 6, a scanning section 10 receives N(=6) (8×8) DCT blocks and scans AC coefficients while excluding a DC coefficient among coefficients of respective DCT blocks, and an absolute-value getting section 20 takes output values from outputs of scanning section 10. A maximum value detecting section 30 obtains the maximum values ACmax of respective DCT blocks from outputs of absolute-value getting section 20. A buffer 40 buffers outputs of maximum value detecting section 30, and a minimum value detecting section 50 obtains the minimum value ACmin among respective maximum values ACmax of the N DCT blocks from outputs of buffer 40. A deciding section 60 utilizes outputs of minimum value detecting section 50 as threshold values TH to be compared with the outputs of buffer 40, thereby deciding the classes with respect to the DCT blocks.

Figure 7:
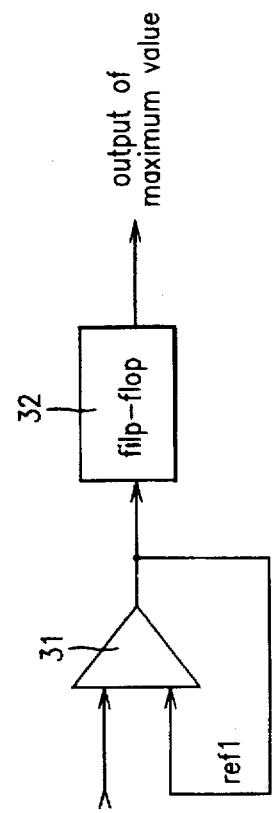
FIG. 7 is a construction view showing the maximum value detecting section of FIG. 6.

As shown in FIG. 7, maximum value detecting section 30 is formed of a comparator 31 for sequentially receiving to compare the N-numbered AC coefficients taking the absolute values in absolute-value getting section 20 to provide the largest value, and a flip-flop 32 for temporarily storing the output of comparator 31.

Also, minimum value detecting section 50 is constructed to be similar to maximum detecting section 30.

Figure 8:
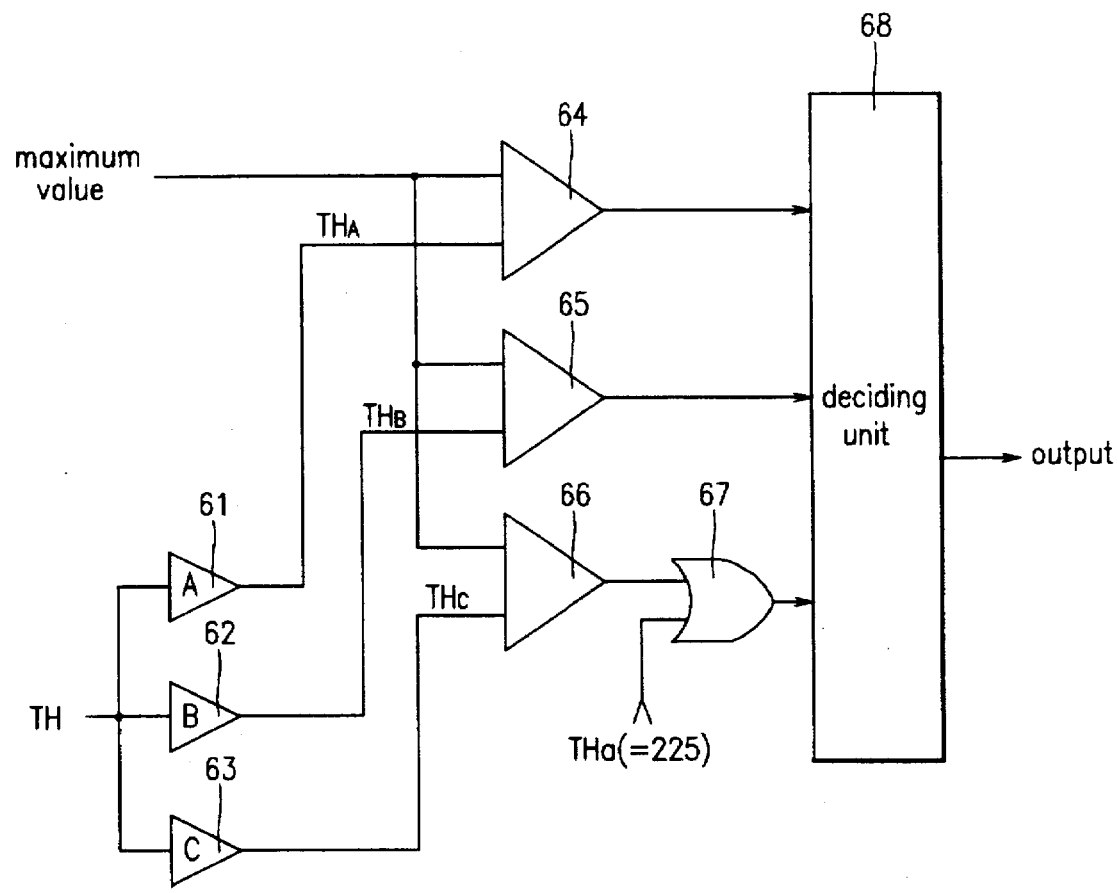
FIG. 8 is a construction view showing the deciding section of FIG. 6.

Deciding section 60 includes, as shown in FIG. 8, amplifiers 61, 62 and 63 for enlarging outputs of minimum value detecting section 50 by as many as prescribed amplification constants A, B and C, and comparators 64, 65 and 66 for comparing the outputs of amplifiers 61–63 as threshold values THA–THC with the maximum values ACmax of respective DCT blocks of maximum value detecting section 30. Additionally, an OR gate 67 is connected to comparator 66 for deciding the classes when the maximum values ACmax of respective DCT blocks are larger than threshold value THa having the prescribed value of 255, and a deciding unit 68 utilizes the outputs of comparators 64–66 and OR gate 67 to decide the classes of the DCT blocks.

In the apparatus for deciding the DCT classes constructed as above, N (=6) (8×8) DCT blocks constituting the macro block are supplied into scanning section 10 to scan the AC coefficients, and the absolute values are taken via absolute-value getting section 20.

Also, the outputs of absolute-value getting section 20 are supplied into maximum value detecting section 30 to obtain the maximum values ACmax of respective DCT blocks, and the maximum values ACmax are obtained as follows.

In more detail, absolute-valued AC coefficients numbering 63 which is the number of the AC coefficients in (8×8) DCT block are supplied into comparator 31 to be continuously compared with the sequentially-provided AC coefficients, so that the largest value is produced as the maximum value ACmax.

At this time, flip-flop 32 stores the larger value between two AC values obtained by comparing the AC coefficients in such a manner that the largest AC coefficient value is stored, and the maximum value ACmax latched to flip-flop 32 is stored in buffer 40 in the DCT block unit.

Meantime, a comparison value refl of comparator 31 is reset in the DCT block unit.

Minimum value detecting section 50 obtains the minimum value ACmin among N maximum values ACmax stored in buffer 40 in the same way of detecting the maximum value ACmax to transmit the result to deciding section 60.

Deciding section 60 uses the minimum value ACmin of minimum value detecting section 50 as threshold value TH to execute the class decision with respect to the DCT blocks.

In other words, the minimum value ACmin being the output of minimum value detecting section 50 is amplified in amplifiers 61–63 by as many as prescribed amplification constants A, B and C to provide the amplified values as threshold values THA–THC of comparators 64–66.

Here, prescribed amplification constants A–C are selected by considering the quantization step of the succeeding stage. For example, when the quantization step size as shown in FIG. 5 is employed, the quantizer size is increased by $2^n$ per class. In this case, amplification values A, B and C are determined as 2, 4 and 8, respectively.

Also, comparators 64–66 compare the maximum value ACmax of maximum value detecting section 30 supplied via buffer 40 with threshold values THA–THC, and the output of comparator 66 is supplied to OR gate 67 to be sorted as the same class as in the case that the maximum value ACmax exceeds threshold value THa of the prescribed value of 255.

That is, the outputs of comparators 64–66 and OR gate 67 are supplied to deciding unit 68 to perform the final class decision, while comparators 64–66 determines just the size by comparing threshold values THA–THC with the maximum values ACmax.

At this time, the class is decided as below.

In case that ACmax<THA, it is decided as class 0; THA⊆ACmax<THB, as class 1; THB⊆ACmax<THC, as class 2; THC⊆ACmax, as class 3; and ACmax>THa, as class 3.

As can be noted, OR gate 67 is an exceptional stipulation which is provided only for executing the decision when the maximum value ACmax is larger than THa (=255).

As described above, since the threshold values has been fixed typically, the macro blocks or segments are not sorted by four steps when the dynamic range of the AC coefficients are significantly changed in respective macro blocks or segments. However, in the present invention, the maximum values are searched out in respective DCT blocks in the macro block or segment unit, and then the minimum value is searched out in the maximum values to be utilized as the threshold value. Therefore, the class of respective macro blocks or segments are sorted by four steps when overall AC coefficient values are small or large in respective macro blocks or segments.

Consequently, the quantization is performed in the class steps numbering four, so that the quantization error is decreased.

As described above, in the apparatus for deciding DCT block classes in the DVCR, the relative characteristics between respective DCT blocks and quantization step size within the macro block are considered to obtain the threshold values utilized for the class decision of the DCT block. As a result, the classes of the DCT blocks are adaptively sorted with respect to the input picture to reduce the quantization error, so that quantization efficiency is enhanced to improve picture quality.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for deciding DCT block classes in a DVCR comprising:

scanning & absolute-value getting means for scanning AC coefficients among coefficients of respective DCT blocks, and taking absolute values for said AC coefficients;

maximum value detecting means for sequentially comparing said AC coefficients of respective DCT blocks taking said absolute values in said scanning & absolute-value getting means, and obtaining the maximum values of respective DCT blocks;

minimum value detecting means for comparing respective maximum values of said plurality of DCT blocks obtained in said maximum value detecting means, and obtaining the minimum values; and deciding means for comparing outputs of said minimum value detecting means as threshold values with outputs of maximum value detecting means, and determining said classes with respect to said DCT blocks.

2. An apparatus for deciding DCT block classes in a DVCR as claimed in claim 1, wherein said maximum value detecting means obtains said maximum values of respective DCT blocks in a macro block unit.

3. An apparatus for deciding DCT block classes in a DVCR as claimed in claim 1, wherein said maximum value detecting means obtains said maximum values of respective DCT blocks in a segment unit.

4. An apparatus for deciding DCT block classes in a DVCR as claimed in claim 1, wherein said deciding means comprises:

first, second and third amplifiers for enlarging outputs of said minimum detecting means by prescribed amplification constants, respectively;

first, second and third comparators for using outputs of said first, second and third amplifiers as first, second and third threshold values to be compared with said maximum values of respective DCT blocks of said maximum value detecting means;

an OR gate connected to said third comparator for deciding said class when said maximum values of said respectively blocks are larger than the threshold value having a prescribed value; and a deciding unit for deciding said classes by using outputs of said first, second and third comparators and OR gate.

5. An apparatus for deciding DCT block classes in a DVCR as claimed in claim 1, wherein said deciding means decides said class of said DCT blocks by four kinds.

6. An apparatus for deciding DCT block classes in a DVCR as claimed in claim 1, wherein said deciding means determines said maximum value as class 0 when it is smaller than said first threshold value, as class 1 when it equals to or larger than said first threshold value and smaller than said second threshold value, as class 2 when it equals to or smaller than said second threshold value and smaller than said third threshold value, as class 3 when it is larger than or equals to said third threshold value, and as class 3 when it is larger than said threshold value having said prescribed value.

7. An apparatus for deciding DCT block classes in a DVCR as claimed in claim 6, wherein said threshold value of said prescribed value is 255.

8. An apparatus for deciding DCT block classes in a DVCR as claimed in claim 5, wherein said deciding means determines said maximum value as class 0 when it is smaller than said first threshold value, as class 1 when it equals to or larger than said first threshold value and smaller than said second threshold value, as class 2 when it equals to or smaller than said second threshold value and smaller than said third threshold value, as class 3 when it is larger than or equals to said third threshold value, and as class 3 when it is larger than said threshold value having said prescribed value.

\* \* \* \* \*